United States Patent [19]

Anderson

[11] Patent Number: 5,669,217

[45] Date of Patent: Sep. 23, 1997

[54] METHOD AND APPARATUS FOR INTERCOOLING GAS TURBINES

[76] Inventor: J. Hilbert Anderson, 2422 S. Queen St., York, Pa. 17402

[21] Appl. No.: 533,377

[22] Filed: Sep. 25, 1995

[51] Int. Cl.⁶ .................... F02C 3/30; F02C 7/143
[52] U.S. Cl. .................. 60/39.05; 60/39.53; 60/728
[58] Field of Search .................. 60/39.05, 39.3, 60/39.53, 728, 39.33

[56] References Cited

U.S. PATENT DOCUMENTS

| | | | |
|---|---|---|---|
| 2,407,165 | 9/1946 | Kreitner et al. | 60/39.53 |
| 2,432,359 | 12/1947 | Streid | 60/39.33 |
| 2,549,819 | 4/1951 | Kane | 60/39.53 |
| 2,678,531 | 5/1954 | Miller | 60/39.05 |
| 3,877,218 | 4/1975 | Nebgen | 60/728 |
| 5,353,585 | 10/1994 | Munk | 60/728 |

FOREIGN PATENT DOCUMENTS 1094635  5/1955  France ............... 60/39.53

*Primary Examiner*—Louis J. Casaregola

[57] ABSTRACT

The invention relates to an intercooled gas turbine having at least two air compression stages, and at least one nozzle for supplying a liquid coolant to air travelling between the at least two air compression stages. The invention also relates to a method for intercooling a gas turbine having at least two compression stages in which a liquid coolant is supplied to air travelling between the at least two compression stages, whereby the liquid coolant cools the air.

12 Claims, 1 Drawing Sheet

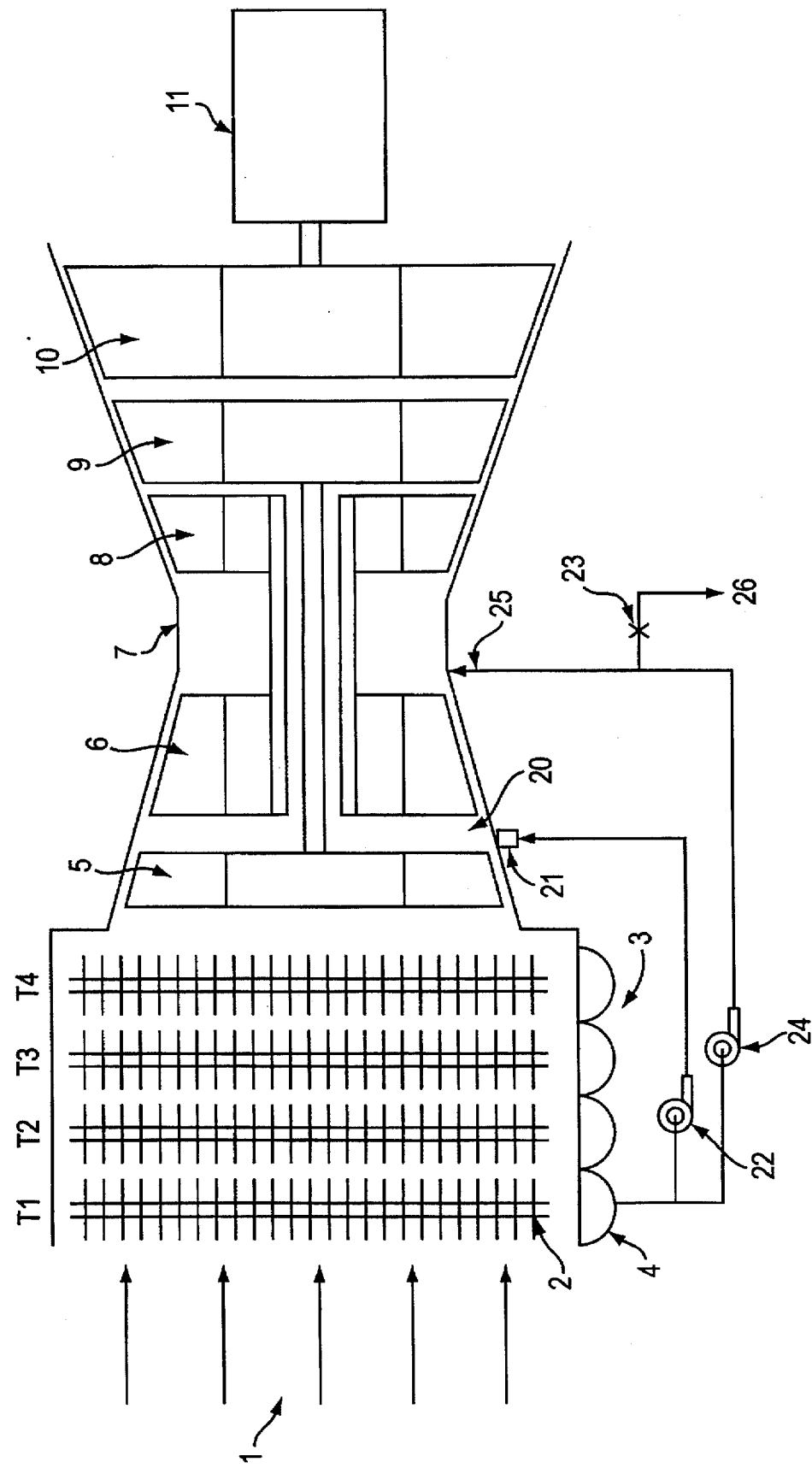

5,669,217

METHOD AND APPARATUS FOR INTERCOOLING GAS TURBINES

SUMMARY OF THE INVENTION

This invention relates to a method of intercooling a gas turbine by supplying a liquid coolant to compressed air travelling between compression stages in a multi-compression stage gas turbine. The invention also relates to an apparatus for intercooling a gas turbine.

DESCRIPTION OF RELATED ART

It has long been known, and is accepted practice, to cool the air between the stages of compression in an air compressor. This has the benefit of reducing the power required, and also reduces the discharge temperature from the air compressor.

There have been attempts to apply these same cooling principles to the compressor used in a gas turbine system, where pressure ratios may be as high as 36 to 1, and the corresponding discharge temperature from the compressor being quite high. Such gas turbines can be used for generating electricity.

However, while there are theoretical benefits gained by intercooling the air at various stages going through the compressor to a gas turbine, there are also major problems. Gas turbines are very compact and the air travelling through the axial flow compressors has a high velocity, on the order of about 400 feet per second. Gas turbines are also compact to keep the size of the system small and to make the construction economical.

The compressor of a gas turbine is typically divided into two or more stages. In the known method for intercooling the air between compressor stages, the velocity of the air leaving one compressor stage is significantly reduced and then passed through a separate heat exchanger which may be cooled by water. The air being cooled must then disadvantageously be re-accelerated and returned to the next stage of the gas turbine compressor.

Since the air leaving the first stage and entering the second stage of compression is at very high velocity, on the order of about 400 feet per second, there is a significant undesirable power loss in the diffusion of the air to a reduced velocity as it passes through the intercooler. This loss reduces the benefit of cooling the air before entering the next compression stage.

In addition to the much greater space required, the cost of the intercooler, and the loss of efficiency due to decelerating and accelerating the air between stages, there is another major problem. The air entering the first stage compressor often contains a maximum amount of moisture, such as occurs in the summer when high humidity is present. As the air is cooled in the intercooler and the temperature drops, the air becomes completely saturated and water vapor condenses in the intercooler, which is undesirable.

This water must be removed before it enters the next stage of compression. This involves reducing the velocity of the air out of the intercooler, and usually installing eliminator screens so as to minimize the amount of water that would be carried into the next stage. All of these factors make intercooling the air between compression stages in a gas turbine unattractive.

There is a need for an intercooling method which avoids the above problems.

SUMMARY OF THE INVENTION

An objective of the present invention is to intercool the air between compression stages of a gas turbine while at the same time not reducing the velocity of the air.

Another objective of the invention is to intercool the air between compression stages while a the same time avoiding moisture contact with the rotor blades of the gas turbine.

These objectives and other objectives are achieved by the following.

It has now surprisingly been found that intercooling without the complexity, pressure losses, and high cost of the usual water cooled intercooler, can be accomplished by supplying a liquid coolant to the air travelling between compression stages in a multi-compression stage gas turbine.

The invention relates to an intercooled gas turbine comprising a gas turbine having at least two air compression stages, and at least one nozzle for supplying a liquid coolant to air travelling between the at least two air compression stages.

The invention also relates to an intercooled gas turbine comprising an air cooling system for cooling and reducing the water content of air and a gas turbine having at least two air compression stages. The air cooling system being connected to the gas turbine such that the cooled and water reduced air is supplied to an air inlet of the gas turbine. The cooled and water reduced air being compressed in a compression stage whereby a temperature of the water reduced and cooled air is increased. The gas turbine further comprises at least one nozzle for supplying a liquid coolant to the temperature increased air leaving the compression stage and entering another compression stage, to thereby cool the temperature increased air before the temperature increased air is compressed in the another compression stage.

The invention further relates to a method for intercooling a gas turbine comprising at least two compression stages. The method comprises the steps of supplying a liquid coolant to air travelling between the at least two compression stages, whereby the liquid coolant cools the air.

The invention also relates to a method for intercooling a gas turbine comprising at least two compression stages. The method comprises the steps of cooling and reducing the water content of air to produce a cooled and water reduced air, supplying the cooled and water reduced air to an inlet of the gas turbine, compressing the cooled and water reduced air in a compression stage of the gas turbine to produce a compressed, heated, water reduced air, supplying a liquid coolant to the compressed, heated, water reduced air to produce a cooled, compressed air, and supplying the cooled, compressed air to another compression stage of the gas turbine.

BRIEF DESCRIPTION OF THE DRAWING

The drawing shows a perspective view of a two spool gas turbine containing an intercooling apparatus according to the present invention.

DETAILED DESCRIPTION OF PREFERRED EMBODIMENTS

This invention is particularly attractive for a gas turbine in which the inlet air is refrigerated to a low temperature, whereby the water content of the air is reduced to a minimum value. An example of such air refrigeration is disclosed in U.S. Pat. No. 5,408,835, entitled "Apparatus and Method for Preventing Ice From Forming on a Refrigeration System", which is incorporated herein by reference. That patent discloses how it is possible to refrigerate the inlet air to a gas turbine to temperatures far below the normal water freezing temperature by adding an antifreeze to the evaporators and thereby lowering the freezing point of the water that is being condensed out of the air.

By reducing the water content of the air that enters the compressor to a very low value, the air compressed in the first stage of compression contains a very small amount of water vapor, and the vapor pressure in the compressed air leaving the first compression stage is far below saturation pressure. Therefore, it is possible to add a liquid coolant to the compressed air leaving the first compression stage, which evaporates and cools the compressed air.

The invention will be further explained with reference to the drawing. The drawing shows diagrammatically the flow pattern through a two spool gas turbine, which has three separate turbines and two separate compressors.

Referring to the drawing, the air enters at the left, shown at 1, and passes through a series of refrigerant cooled evaporators, shown at 2, which successively reduces the air temperature to about 36° F. (shown at T1), about 17° F. (shown at T2), about −4° F. (shown at T3), and finally to about −22° F. (shown at T4). As the air passes through the successive evaporators, shown at 2, water is condensed out of the air and falls into the drain basins, shown at 3, at the bottom of each of the evaporators. An example of such an air cooling system is described in U.S. Pat. No. 5,408,835, which is incorporated herein by reference.

In U.S. Pat. No. 5,408,835, in order to prevent freezing of condensed water, an antifreeze is sprayed on the evaporators, thereby causing the water to condense as an antifreeze solution which does not freeze. An example of a suitable antifreeze is alcohol. The water/antifreeze mixture falls into the drain basins, and is eventually collected in the highest temperature drain basin on the left, shown at 4.

The cooled air passes first through the low pressure compressor, shown at 5, where it may be compressed to a pressure of about 41 pounds per square inch absolute ("psia").

The compressed air then passes to the high pressure compressor, shown at 6, where the air is additionally compressed to a higher pressure such as about 879 psia. After leaving the high pressure compressor, shown at 6, the air passes through the combustor, shown at 7, where fuel is added and burned to increase the temperature to high levels, such as about 2250° F.

The hot gas produced in the combustor, shown at 7, passes through a high pressure turbine, shown at 8, which develops sufficient power to drive the high pressure compressor, shown at 6.

After leaving the high pressure turbine, shown at 8, the hot gas passes through an intermediate pressure turbine, shown at 9, which develops sufficient power to drive the low pressure compressor, shown at 5. The high pressure compressor and turbine normally travel at higher rotative speeds than the low pressure compressor and intermediate pressure turbine in order to achieve better adaptation to the volumes of air and gas passing through.

After leaving the intermediate pressure turbine, shown at 9, the gas passes through a low pressure turbine, shown at 10, which is connected to, and drives a generator, shown at 11, that generates electricity.

In order to intercool the air after leaving the low pressure compressor, shown at 5, a liquid coolant is sprayed into the space between the low pressure and the high pressure compressors, shown at 20. The liquid coolant can be, for example, water, an organic liquid, or mixtures of water and an organic liquid. The organic liquid can be a mixture of liquids. Preferably, the liquid coolant is a water/organic liquid mixture. More preferably, the liquid coolant is a mixture of water and a combustible organic liquid that is miscible with water, such as a water/alcohol mixture.

If the liquid coolant contains water, the amount of liquid coolant that can be sprayed into the space, shown at 20, is limited by the amount of water required to saturate the air. This limits the temperature to which the air can be cooled. However, because there is almost no water in the air entering the low pressure compressor, shown at 5, the intercooling effect is surprisingly significant.

Since the axial velocity of the air leaving the low pressure compressor is quite high, such as perhaps 400 feet per second, then the water must be evaporated rapidly in order to obtain the maximum intercooling effect. Furthermore, the water should evaporate before contacting the high velocity blades to avoid erosion of the high velocity blades in the high pressure compressor. Therefore, it is important to inject the liquid coolant into the space in the form of particles that are fine enough so that they can evaporate rapidly to avoid erosion of the high velocity blades in the high pressure compressor. Preferably, the average particle size of the liquid coolant is about 20 microns or less, more preferably about 10 microns or less, and most preferably about 5 microns or less.

The relationship of time of evaporation of a water droplet to its diameter can be shown by the equation $T=D^{1.92}/11,200$. Here T is time in seconds, and D is the diameter of the droplet in microns. This equation applies to water sprayed into still air at atmospheric pressure with a temperature difference of 200° F. between the air and the water. For example if D=10 microns T=0.0075 seconds. If D=5 microns then D=0.002 seconds.

At 400 feet per second air velocity, the distance traveled for the water to evaporate in this example is about 9.6 inches. Although the equation above might indicate that the time required for evaporating water into the air stream might be too great to be usable in a two spool gas turbine, it should be noted that at the high air velocity involved the rate of evaporation will be much higher than that in still air. Also, because the air is at a significantly higher density than atmospheric, the rate of heat transfer and evaporation will be significantly greater. The heat transfer rate, in general, is proportional to the density and to the velocity.

For example, it is possible to create very fine droplets by means of a fog nozzle made of extremely hard rubies, shown at 21, operating at very high inlet pressure, such as about 1500 psi. By using a high pressure pump, shown at 22, and a fog nozzle with a ruby throat, most of the liquid coolant droplets can be reduced in size to about 5 microns or less, which can be a means for intercooling the air between the compressor stages. More than one fog nozzle can be used. Although the theoretical value of saturating the air with water vapor may not be reached, it is still well worthwhile to intercool the air, even if only a drop of a few degrees temperature is achieved.

An additional factor that promotes smaller size droplets is that organic liquids, such as alcohol, have a significantly smaller surface tension than water.

Even though not all of the water droplets may be evaporated prior to entering the second stage of compression, the effect will remain as the water droplets pass through the blades. An important consideration is to have droplets small enough so that they will pass along with the air stream without eroding the blades. Droplets smaller than about 20 microns in diameter should flow with the air stream and should not erode the blades.

The reduction in horsepower required to operate the high pressure compressor is surprisingly significant, even for a few degrees temperature reduction by intercooling. The discharge temperature from the high pressure compressor will also be reduced if the inlet temperature is reduced.

For example, where a low stage compressor produces a pressure ratio of 2.89:1, and operates at 90% polytropic efficiency, the discharge temperature from the low pressure compressor with air entering at −22° F. will be 156° F.

The equation for the amount of water contained in air at its saturation level is as follows: $W_s=0.62198 \times P_{ws} \div (P-P_{ws})$. $W_s$ is the pounds of water contained in each pound of dry air. $P_{ws}$ is the vapor pressure of water in pounds per square inch absolute. P is the total pressure of the air water mixture in pounds per square inch absolute. For example, at 156° F., $W_s=0.0702849$ pounds of water per pound of dry air.

Because this is a higher quantity than the 0.0002546 pounds of water per pound of air at −22° F., then if water is added, it can evaporate and cool the air by absorbing the heat of vaporization of the water. In this example, it is possible to add enough water to reduce the temperature from 156° F. down to 98° F. in the intercooler, if sufficient water is evaporated to saturate the air at 98° F. and a pressure of 41.86 psia.

The horsepower required to compress air through a given pressure ratio is directly proportional to the specific volume of the air. The specific volume is directly proportional to the absolute temperature. Therefore, if the air is cooled from 156° F. or 616 degrees Rankine down to 98° F. or 558 degrees Rankine, the compressor horsepower should be reduced in the ratio of 558 over 616.

In a sample case, a two spool gas turbine ingests 583 pounds per second of dry air with the inlet temperature at −22° F.

If an air cooling system is used, as shown in U.S. Pat. No. 5,408,835, the water/antifreeze mixture collected can be used as the liquid coolant. However, there may be much more water/antifreeze mixture draining from the evaporators than can be used as the liquid coolant. Therefore, separate pumps can be used, as shown in the drawing at 22 and 24, for injecting the water/antifreeze mixture into the gas turbine. Pump 22 can be used to inject the water/antifreeze solution into the space shown at 20, which is used as the liquid coolant, and the pump 24 can be used to inject the water/antifreeze mixture into the combustor at the location shown at 25. For example, the pump 24 can be used to inject the water/antifreeze mixture at the inlet of the combustor or down stream from the main burners. In either case, the combination of water/antifreeze injection will help to reduce the production of nitrogen oxides.

In the example described above, the gas turbine produces 100 megawatts of shaft power with an inlet air flow of 583 pounds per second at −22° F. The first stage compressor discharges air at 41.86 psia and 156° F.

The second, or higher stage compressor increases the pressure through a ratio of 21.0:1. At 90% polytropic efficiency the power required by the second compressor is 199,554 horsepower. The air flow leaving the intermediate pressure turbine passes through the low pressure turbine, which transmits 100,000 kilowatts to drive the generator.

If the air is intercooled to 98° F., the power required for the second compressor at the same pressure ratio would be 183,227 horsepower. This is 16,327 horsepower or 12,165 kilowatts less than the horsepower or kilowatts required without intercooling according to this invention.

This reduction in compressor power is directly additive to the power available from the low pressure turbine. Therefore, the power output will now be 100,000+12,165 kw, a net increase of 12%.

Although the amount of water/antifreeze coming from the evaporators may be small and, if alcohol is used as the antifreeze, the alcohol injection would normally only be approximately 3% of the fuel flow to the combustor, preferably there is a separate control of the water/antifreeze injected to the combustor. This is shown in the drawing by a valve, shown at 23, which taps the water/antifreeze from the line going from the pump, shown at 24, to the water/antifreeze injection, shown at 25, and allowing water/antifreeze mixture to flow to the drain, shown at 26, if so desired.

This invention provides a means for significantly increasing the power output from a gas turbine, without undue complications, and without the large expenses involved in other types of intercooling systems for gas turbines.

The gas turbine can be used to drive machinery other than electrical generators, such as large pumps or compressors.

While the claimed invention has been described in detail and with reference to specific embodiments thereof, it will be apparent to one of ordinary skill in the art that various changes and modifications can be made therein without departing from the spirit and scope of the claimed invention.

We claim:

1. An intercooled gas turbine comprising:
   a gas turbine having at least two air compression stages; and
   at least one nozzle for supplying a liquid coolant to air travelling between said at least two air compression stages, wherein said nozzle has a structure which supplies said liquid coolant to said air at an average particle size of about 5 microns or less.

2. An intercooled gas turbine according to claim 1, further comprising an electrical generator or other machine connected to and driven by said gas turbine.

3. An intercooled gas turbine comprising:
   an air cooling system that cools the inlet air below a temperature of 0° C. reducing the water content of air to a negligible amount;
   a gas turbine having at least two independently and coaxially arranged compressor rotors, said inlet air cooling system being connected to said gas turbine such that the cooled and water reduced air is supplied to an air inlet of the gas turbine, said cooled and water reduced air being compressed in at least one compression stage whereby the temperature of said water reduced and cooled air is increased;
   at least one nozzle for supplying a liquid coolant to said temperature increased air leaving said compression stage and entering a succeeding compressor rotor, to thereby cool said temperature increased air before said temperature increased air is compressed in the succeeding compressor rotor; and
   means for supplying condensed water mixed with alcohol from said air cooling system to said nozzle, whereby said liquid coolant comprises a solution of water and alcohol.

4. An intercooled gas turbine according to claim 3, wherein said nozzle, in combination with a high pressure liquid pump, has a structure which supplies said liquid solution to said air at an average particle size which does not significantly deteriorate a rotor blade present in said succeeding compressor rotor.

5. An intercooled gas turbine according to claim 4, wherein said nozzle and pump supplying liquid have a structure which supplies said liquid coolant to said air at an average particle size of about 10 microns or less.

6. An intercooled gas turbine comprising:

an air cooling system for cooling and reducing the water content of air;

a gas turbine having at least two air compression stages, said air cooling system being connected to said gas turbine such that the cooled and water reduced air is supplied to an air inlet of the gas turbine, said cooled and water reduced air being compressed in at least one compression stage whereby a temperature of said water reduced and cooled air is increased;

at least one nozzle for supplying a liquid coolant to said temperature increased air leaving said compression stage and entering another compression stage, to thereby cool said temperature increased air before said temperature increased air is compressed in said another compression stage, wherein said nozzle has a structure which supplies said liquid coolant to said air at an average particle size of about 5 microns or less.

7. An intercooled gas turbine according to claim 3, further comprising an electrical generator connected to and driven by said gas turbine.

8. A method for intercooling a gas turbine comprising at least two compression stages, the method comprising the steps of:

supplying a liquid coolant to air travelling between said at least two compression stages, whereby said liquid coolant cools said air; and supplying said liquid coolant to said air such that an average particle size of said liquid coolant is less than about 5 microns.

9. A method for intercooling a gas turbine comprising at least two compression stages, the method comprising the steps of:

cooling the intake air to a temperature below 0° C., thereby producing cooled and water reduced air;

supplying said cooled and water reduced air to an inlet of said gas turbine;

compressing said cooled and water reduced air in at least one compression stage of said gas turbine to produce a compressed, heated, water reduced air;

supplying a liquid solution of water and alcohol to said compressed, heated, water reduced air to produce cooled compressed air, by evaporating the liquid solution before it enters the succeeding compression stage;

supplying said cooled, compressed air to another compression stage of said as turbine; and collecting the water which is condensed in said step of cooling and reducing the water content of air, adding alcohol to said condensed water to form said liquid solution of water and alcohol.

10. A method for intercooling a gas turbine comprising at least two compression stages, the method comprising the steps of:

cooling and reducing the water content of air to produce a cooled and water reduced air;

supplying said cooled and water reduced air to an inlet of said gas turbine;

compressing said cooled and water reduced air in at least one compression stage of said gas turbine to produce a compressed, heated, water reduced air;

supplying a liquid coolant to said compressed, heated, water reduced air to produce a cooled, compressed air; and supplying said cooled, compressed air to another compression stage of said gas turbine, wherein said liquid coolant is supplied to said air such that an average particle size of said liquid coolant is less than about 5 microns.

11. A method for intercooling a gas turbine comprising at least two compression stages, the method comprising the steps of:

cooling the intake air to a temperature below 0° C., thereby producing cooled and water reduced air;

supplying said cooled and water reduced air to an inlet of said gas turbine;

compressing said cooled and water reduced air in at least one compression stage of said gas turbine to produce a compressed, heated, water reduced air;

supplying a liquid solution of water and alcohol to said compressed, heated, water reduced air such that an average particle size of said liquid solution is less than about 5 microns to produce cooled compressed air, by evaporating the liquid solution before it enters the succeeding compression stage;

supplying said cooled, compressed air to another compression stage of said gas turbine.

12. A method according to claim 9, further comprising the step of using power produced by said gas turbine to drive an electrical generator or other machine.

* * * * *